(12) United States Patent
Nakagawa

(10) Patent No.: US 11,840,250 B2
(45) Date of Patent: Dec. 12, 2023

(54) METHODS AND SYSTEMS FOR INFORMING DRIVERS OF VEHICLE OPERATING FUNCTIONS

(71) Applicant: Toyota Motor Engineering & Manufacturing North America, Inc., Plano, TX (US)

(72) Inventor: Masashi Nakagawa, Sunnyvale, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 201 days.

(21) Appl. No.: 17/079,698

(22) Filed: Oct. 26, 2020

(65) Prior Publication Data

US 2022/0126852 A1 Apr. 28, 2022

(51) Int. Cl.
*B60W 50/14* (2020.01)
*B60W 40/08* (2012.01)
*H04L 9/32* (2006.01)
*G06V 20/59* (2022.01)
*G06V 20/05* (2022.01)

(52) U.S. Cl.
CPC ............ *B60W 50/14* (2013.01); *B60W 40/08* (2013.01); *G06V 20/05* (2022.01); *H04L 9/3247* (2013.01); *B60W 2420/42* (2013.01); *B60W 2540/043* (2020.02); *B60W 2540/045* (2020.02); *B60W 2556/10* (2020.02); *B60W 2556/45* (2020.02)

(58) Field of Classification Search
CPC ................ B60W 50/14; B60W 40/08; B60W 2540/043; B60W 2556/10; B60W 2540/045; B60W 2556/45; B60W 2420/42; G06V 20/59; H04L 9/3247
See application file for complete search history.

(56) References Cited

U.S. PATENT DOCUMENTS

| | | |
|---|---|---|
| 2011/0057784 A1 | 3/2011 | Nakamura et al. |
| 2013/0211660 A1* | 8/2013 | Mitchell ................ G08G 1/127 701/29.3 |
| 2015/0112512 A1* | 4/2015 | Fan ........................ B60G 17/02 701/1 |
| 2015/0163306 A1 | 6/2015 | Nakagawa |
| 2017/0039489 A1* | 2/2017 | Reh ........................ G06Q 30/016 |
| 2017/0197523 A1* | 7/2017 | Magaña ................ B60N 2/0244 |
| 2017/0232914 A1* | 8/2017 | Brenner ................ B60R 16/037 701/36 |
| 2017/0270490 A1* | 9/2017 | Penilla .................... G07C 5/006 |
| 2017/0327084 A1* | 11/2017 | Park ........................ B60R 16/037 |
| 2019/0291719 A1* | 9/2019 | Tiziani .................. B60W 10/20 |

(Continued)

FOREIGN PATENT DOCUMENTS

| | | |
|---|---|---|
| DE | 102013019424 A1 | 5/2015 |
| JP | 2001243307 A | 9/2001 |

(Continued)

*Primary Examiner* — Dale W Hilgendorf
*Assistant Examiner* — Hana Lee
(74) *Attorney, Agent, or Firm* — Dinsmore & Shohl LLP

(57) ABSTRACT

A method for instructing users of car-sharing services to operate a shared vehicle includes identifying a user of a selected vehicle, determining a customary vehicle of the user based on the identification, determining differences between the selected vehicle and the customary vehicle, and informing the user of the determined differences.

14 Claims, 4 Drawing Sheets

(56) References Cited

U.S. PATENT DOCUMENTS

2019/0315369 A1   10/2019  Thompson et al.
2020/0088537 A1*  3/2020  Matsunaga ........ G01C 21/3492
2021/0046888 A1*  2/2021  Vardharajan .......... B60W 40/08
2021/0213957 A1*  7/2021  Brown ............... G07C 9/00309

FOREIGN PATENT DOCUMENTS

JP      2004021331 A   1/2004
WO    2016154948 A1  10/2016

* cited by examiner

METHODS AND SYSTEMS FOR INFORMING DRIVERS OF VEHICLE OPERATING FUNCTIONS

TECHNICAL FIELD

The present specification generally relates to car-sharing services, and more specifically, to methods and systems for instructing users of car-sharing services to operate a shared vehicle.

BACKGROUND

Car-sharing services allow customers to rent the vehicles of others for a short duration (e.g., by the hour) and customers of a car-sharing service may choose to operate vehicles of various classes, makes, models, years, or with other distinctive characteristics, features, and systems. The vehicles available in a car sharing service may vary greatly in their offered features and systems and users may wish to rent and operate such vehicles based on their characteristics, but the user may or may not be familiar with such features.

Users who are unfamiliar with one or more systems of a vehicle may choose not to operate the unfamiliar vehicle, preferring familiar vehicles instead. Where familiar vehicles are unavailable, a user may utilize other transportation options or forego a trip entirely. Accordingly, systems and methods for instructing drivers in the functionality and operation of individual cars in a pool of available cars of a car-sharing service are required.

SUMMARY

In one embodiment, a method including identifying a user of a selected vehicle, determining a customary vehicle of the user based on the identification, determining differences between the selected vehicle and the customary vehicle, and informing the user of the determined differences.

In another embodiment, a system includes a user identification device, and a controller configured to identify a user of a selected vehicle, determine a customary vehicle of the user based on the identification, determine differences between the selected vehicle and the customary vehicle, and inform the user of the determined differences.

In yet another embodiment, a method includes identifying a user of a selected vehicle, determining a user instruction history and a customary vehicle of the user based on the identification, determining one or more instruction requirements based on the user instruction history and the customary vehicle of the user, and informing the user of the one or more instruction requirements.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Car-sharing services allow customers (or "users") to rent the vehicles of others for a short duration (e.g., by the hour) and customers of a car-sharing service may choose to operate vehicles of various class, make, model, year, or with other distinctive characteristics. The vehicles available in a car sharing service may vary greatly in their offered features and systems and users may wish to rent and operate such vehicles based on their characteristics but the user may or may not be familiar with such features.

Users who are unfamiliar with one or more systems of a vehicle may choose not to operate the unfamiliar vehicle, preferring familiar vehicles instead. Where familiar vehicles are unavailable, a user may utilize other transportation options or forego a trip entirely. Accordingly, systems and methods for instructing drivers in the functionality and operation of individual cars in a pool of available cars of a car-sharing service are required.

Figure 1:
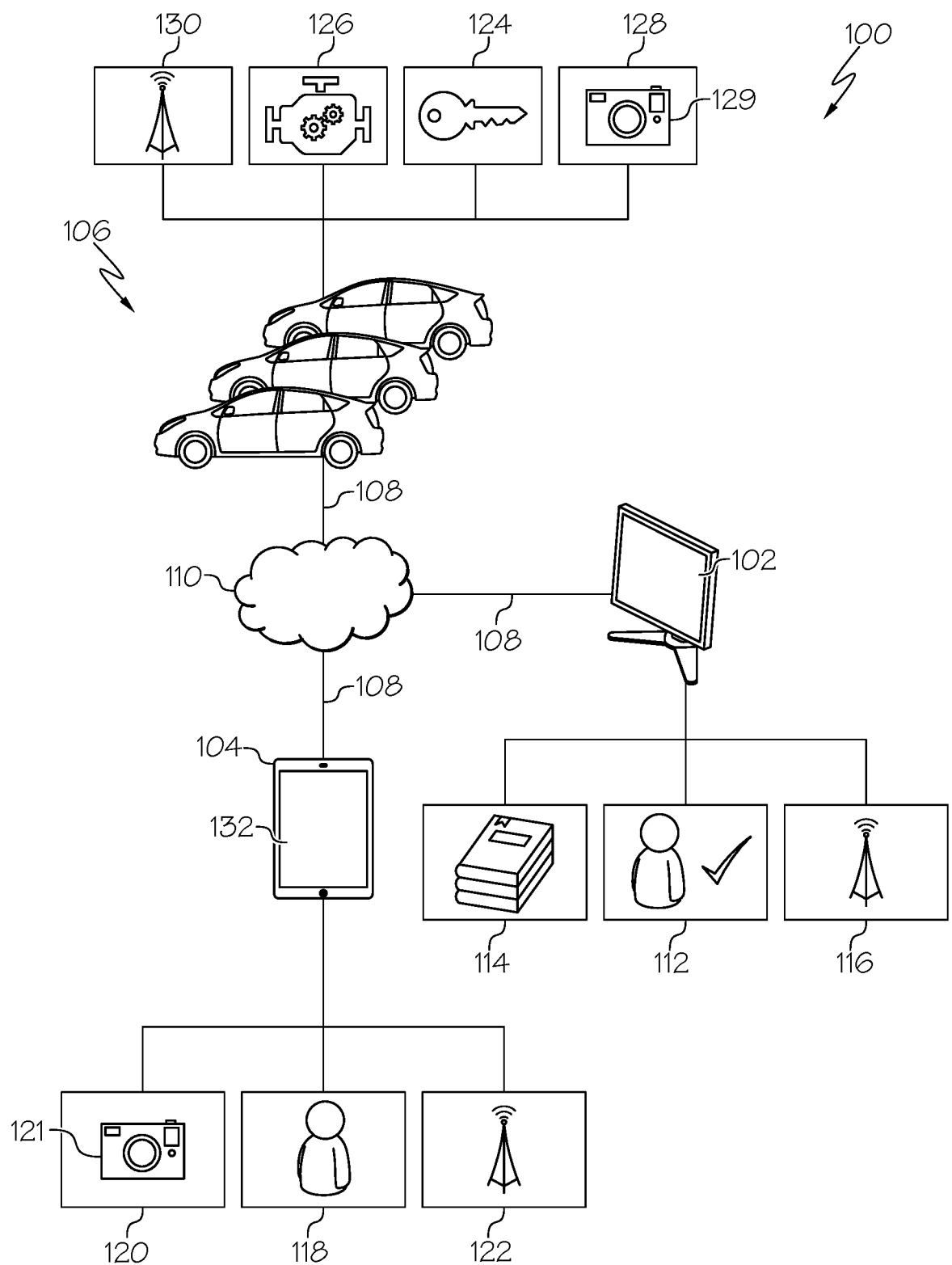
FIG. 1 schematically depicts a system for providing a user with information regarding the operation of a rented vehicle, according to one or more embodiments shown and described herein.

Referring now to FIG. 1, a system 100 for providing instruction to a user of a car-sharing service is shown. The system 100 may include a controller 102, a device 104, and a plurality of vehicles 106. The controller 102, the device 104, and the plurality of vehicles 106 may be communicatively coupled by a communication path 108, which may connect the controller 102, the device 104, and the plurality of vehicles 106 to a network 110.

The controller 102 may include a user profile identification module 112, a user instruction history module 114, and network interface hardware 116. The device 104 may include: an interactive display 132; a user profile module 118; a user identification module 120, which may be communicatively coupled to an imaging device 121 or other device for identifying a user; and network interface hardware 122. Each of the plurality of vehicles 106 may include: an access control module 124; an operational control module 126; a user identification module 128, which may be communicatively coupled to an imaging device 129 or other device for identifying a user; and network interface hardware 130. Each of the user profile identification module 112, the user instruction history module 114, the user profile module 118, the user identification module 120, the access control module 124, the operational control module 126, and the user identification module 128 may be a program module in the form of operating systems, application program modules, and other program modules stored in the controller 102, the device 104, or the plurality of vehicles 106. Such a program module may include, but is not limited to, routines, subroutines, programs, objects, components, data structures and the like for performing specific tasks or executing specific data types as will be described below.

The controller 102 may include, for example, one or more processors and one or more memory modules storing one or more machine-readable instructions. The one or more processors may include any device capable of executing machine-readable instructions. Accordingly, the one or more processors may be a controller, an integrated circuit, a microchip, a computer, or any other computing device. The one or more processors and the one or more memory modules may be communicatively coupled to the other components of the system 100 by the communication path 108. The controller 102 may be a remote server, a local server, an edge device, and the like.

The user profile identification module 112 may look up a user profile associated with a particular user or the device 104 of the user. For example, the user profile identification module 112 may receive an input from the user identification module 128 of each of the plurality of vehicles 106 or from the user identification module 120 of the device 104 that includes identifying information and may associate the identifying information with the user profile. If a user profile has been established for the detected user, then that user profile may be stored in a data storage component of the vehicle or the controller 102 and the user profile identification module 112 may access that user profile. Alternatively, if no user profile exists, the user profile identification module 112 may create a user profile for the detected user. The user profile identification module 112 may also maintain a profile log comprising user profiles previously loaded by each of the plurality of vehicles 106. This log may include a timestamp when each user profile was loaded. Every time that a user profile is loaded, the log may be updated.

In some embodiments, when the user profile identification module 112 determines that no user profile exists for the user, a guest profile may be created for the user. A guest profile may comprise default settings for one or more components of the vehicle that may be loaded when an individual driving the vehicle has not established a user profile. A guest profile may be stored in one or more data storage components of the controller 102. In some examples, a user may adjust the default vehicle settings associated with the guest profile. In some embodiments, a guest profile may be required to conduct at least a minimum required instruction set for a particular vehicle, which may be based on the particular aspects of the vehicle.

The user instruction history module 114 may record a list of instructions or vehicle use information that is associated with a particular user profile. For example, the user instruction history module 114 may record a log of what information has been provided to a user regarding the features, options, settings, or other aspects of one or more of the user's selected vehicles or that are associated with the user's customary vehicle or vehicles. For example, if a user customarily operates a sedan with an automatic transmission, a 6-cylinder engine, and an autonomy level 0 (on the autonomy scale of 0-5), the user instruction history module 114 may record this information. Such information may be used by the controller 102 or one of the plurality of vehicles 106 when determining whether to require user instruction on a particular vehicle aspect or not as discussed in greater detail herein. In embodiments, the user instruction history module 114 may record user instructions provided to the user that the user has received. For example, if the user selects a vehicle with vehicle aspects distinct from his or her customary vehicle and receives instruction on these distinct aspects, the user instruction history module 114 may log such instruction so that repeated uses of distinct aspects do not require further instruction or require less instruction of the user. In some embodiments, a user may be given the option to update his or her own user instruction history when he or she creates a user profile.

The network interface hardware 116 may communicatively couple the controller 102 to the communication path 108. The network interface hardware 116 may be any device capable of transmitting and/or receiving data with external vehicles or servers directly or via a network, such as the network 110. Accordingly, network interface hardware 116 can include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 116 may include hardware configured to operate in accordance with the Bluetooth wireless communication protocol and may include a Bluetooth send/receive module for sending and receiving Bluetooth communications.

The device 104 may be, for example, a portable input/output device (e.g., a smartphone, smart key fob, or digital key fob) including the interactive display 132 (e.g., a touch-screen or tactile display). The interactive display 132 may comprise any known or yet-to-be-developed display, such as LCD, LED, plasma, OLED, CRT, projection, holographic, electronic paper, or any other type of suitable output display. If provided as a tactile display, the interactive display 132 may be any device capable of providing tactile output in the form of refreshable tactile messages. In some embodiments, the device 104 does not include a display, for example, in embodiments in which the device 104 is a display-less key fob that is capable of transmitting and receiving a signal.

The user profile module 118 may save information on the device 104 related to a car-sharing service profile of a user of the device 104. The user profile module 118 stores information regarding the customary vehicle of a user. For example, the user profile module 118 may store a list of customary vehicles, a list of customary characteristics (e.g., characteristics of vehicles that the user customarily operates or interacts with), or other information related to a user's customary use of one or more vehicles. For example, if a user customarily operates a sedan, the user profile module 118 may store such information and the user may be provided fewer or no instructions relating to the user of vehicle aspects (e.g., features, systems, etc.) that are particular to a sedan from among the plurality of vehicles 106 as will be described in greater detail herein. As another example, if a user customarily operates a vehicle with a manual transmission, the user profile module 118 may store such information and the user may be provided fewer or no instructions regarding the use of a manual transmission when he or she selects a vehicle with a manual transmission from among the plurality of vehicles 106. Additionally, the user profile module 118 may store information related to the particular set of operational instructions that a user has received with respect to one or more of the plurality of vehicles 106. For example, if a user receives instructions regarding the activation or deactivation of a passenger seat airbag in a vehicle, the user profile module 118 may record such information.

In some embodiments, the user profile module 118 may store a private key of the user for use with the encrypting and decrypting messages or other signals from the controller 102, the device 104, or one or more of the plurality of vehicles 106. The user profile module 118 may store historical data associated with a user profile such as, for example, a location history, a vehicle preference history that may include information such as, for example, a preference for a particular make, model, size, class, or other vehicle characteristics. In some embodiments, the user profile module 118 may update a user profile based on information relating to a selected vehicle selected from a plurality of vehicles as described in greater detail herein. The user profile module 118 may include a name, age, gender, or other classifying information associated with a user. In some embodiments, the user profile module 118 may store, for example, an image of the user. The user profile module 118 may store one or more credentials of a user, for example, the user profile module 118 may store a driver's license number or image of a user's driver's license in order to verify that the user is licensed to operate a vehicle.

The user identification module 120 may include one or more devices for identifying a user. The devices may include one or more of, for example, imaging devices, retinal scanners, fingerprint or other biometric identifiers, etc. The user identification module 120 may identify a user, for example, using a login or username and a password combination. In some embodiments, the user identification module 120 may utilize a two-factor authentication method. In some embodiments, the user identification module 120 includes the imaging device 121. The imaging device 121 may capture one or more images of the user and compare them with images in a database to identify the user. The database of images may be located, for example, in the controller 102 or may be otherwise accessible via the network 110. In some embodiments, the user identification module 120 of the device 104 may communicate with the user identification module 128 of one or more of the plurality of vehicles 106 in order to verify the user's identity.

The network interface hardware 122 may communicatively couple the controller 102 to the communication path 108. The network interface hardware 122 may be any device capable of transmitting and/or receiving data with external vehicles or servers directly or via a network, such as the network 110. Accordingly, network interface hardware 122 can include a communication transceiver for sending and/or receiving any wired or wireless communication. For example, the network interface hardware 122 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 122 may include hardware configured to operate in accordance with the Bluetooth wireless communication protocol and may include a Bluetooth send/receive module for sending and receiving Bluetooth communications.

Each of the plurality of vehicles 106 may be a vehicle in a pool of vehicles generally offered for use, for example, to a customer ("user") of a car rental service (e.g., a car-sharing service). The plurality of vehicles 106 can include vehicles of any classification, make, model, size, or type. As mentioned, each of the plurality of vehicles 106 may include the access control module 124, the operational control module 126, the user identification module 128, and network interface hardware 130.

The access control module 124 may generate and/or receive a signal that may provide a customer access to the vehicle. For example, the access control module 124 may provide a user access to one or more doors of the vehicle by pulling a handle of the door. In some embodiments, the access control module 124 may communicatively couple with a lock/unlock system of the vehicle (not shown) to lock/unlock one or more doors of the vehicle to provide a user access to the vehicle. In some embodiments, the access control module 124 may be triggered by, for example, a location of the device 104. For example, a particular vehicle may unlock and grant access to a user of the system based on the location of his or her device 104 in relation to the vehicle (i.e., within a particular proximity of the vehicle). Conversely, the vehicle may prevent access (i.e., lock or remain locked) if there is not a known and authenticated device that is permitted access to the vehicle within proximity of the vehicle. The access control module 124 may prevent access to the selected vehicle based on the user having received all required information about the vehicle and having acknowledged receiving such information as described in greater detail herein.

The operational control module 126 may provide a user with selective control of one or more operational functions of the vehicle. For example, the operational control module 126 may selectively allow a user to start and/or stop an engine of the vehicle, to operate a steering wheel, to operate a GPS or other navigational feature of the vehicle, to operate a heads up display (HUD) of the vehicle, to control a velocity or an acceleration of the vehicle (e.g., using a gas pedal, a cruise control system, etc.). The operational control module 126 may provide a user operational control of a vehicle based on, for example, receipt of an acknowledgement from the user that he or she has received all the information related to determined differences between the selected vehicle and a customary vehicle of the user or information that has not been previously acknowledged as having been provided to the user based on a user instructional history as described in greater detail herein.

The user identification module 128 may include one or more devices for identifying a user. The devices may include one or more of, for example, imaging devices, retinal scanners, fingerprint or other biometric identifiers, etc. The user identification module 128 may identify a user, for example, using a login or username and a password combination. In some embodiments, the user identification module 128 may utilize a two-factor authentication method. In some embodiments, the user identification module 128 includes the imaging device 129. The imaging device 129 may capture one or more images of the user and compare them with images in a database to identify the user. The database of images may be located, for example, in the controller 102 or may be otherwise accessible via the network 110. In some embodiments, the user identification module 128 of the vehicle may communicate with the user identification module 120 of the device 104.

The network interface hardware 130 may communicatively couple the controller 102 to the communication path 108. The network interface hardware 130 may be any device capable of transmitting and/or receiving data with external vehicles or servers directly or via a network, such as the network 110. Accordingly, network interface hardware 130 can include a communication transceiver for sending and/or receiving any wired or wireless communication. For example, the network interface hardware 130 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 130 may include hardware configured to operate in accordance with the Bluetooth wireless communication protocol and may include a Bluetooth send/receive module for sending and receiving Bluetooth communications.

The network 110 may include, for example, one or more computer networks (e.g., a personal area network, a local area network, grid computing network, wide area network, etc.), cellular networks, satellite networks and/or a global positioning system and combinations thereof. Accordingly, the controller 102, the device 104, and the plurality of vehicles 106 can be communicatively coupled to the network 110 and/or one another via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Figure 2:
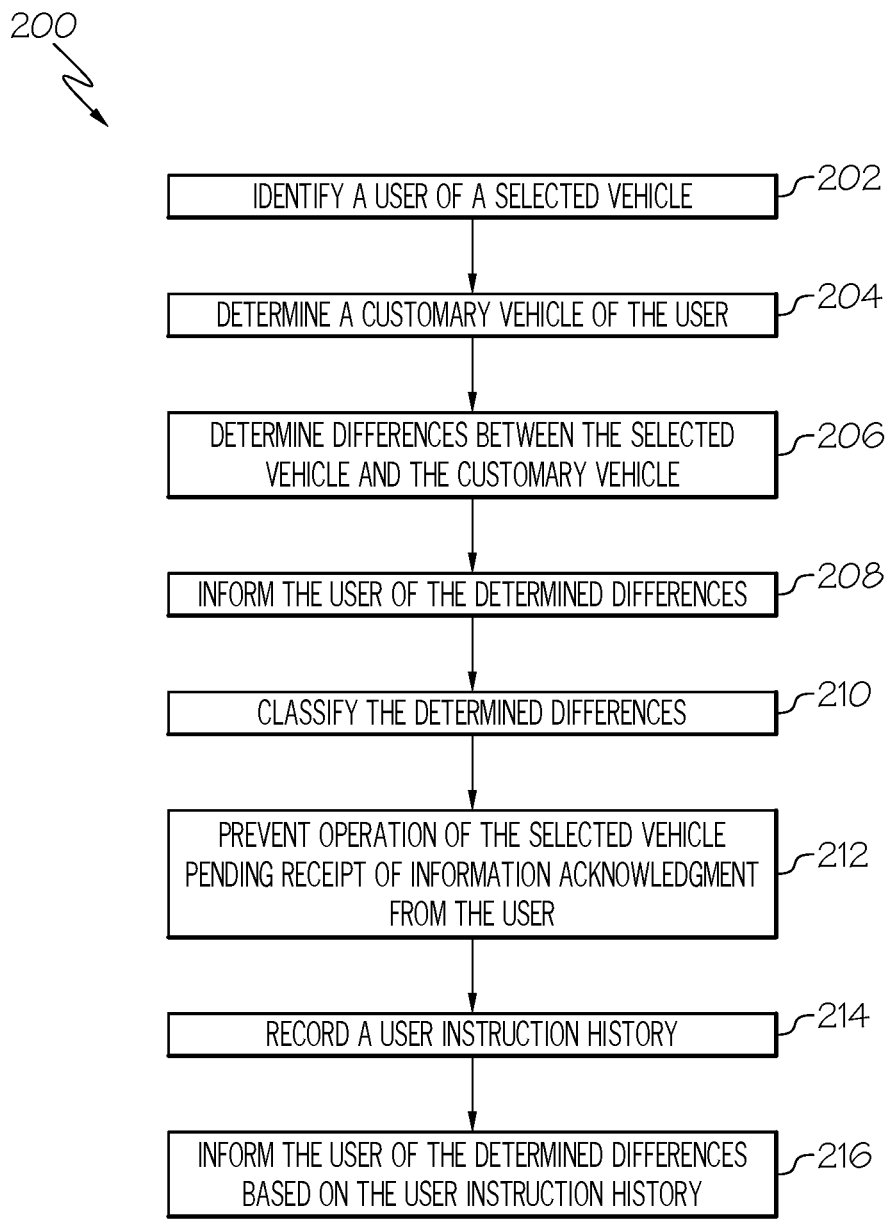
FIG. 2 depicts a method of providing a user instruction for operating a rented vehicle, according to one or more embodiments shown and described herein.

Referring now to FIGS. 1 and 2, a method 200 of identifying a user of a selected vehicle, determining a customary vehicle of the user, determining differences between the selected vehicle and the customary vehicle and informing the user of the determined differences is shown.

At step 202, a user of a selected vehicle is identified. The selected vehicle may be one of the vehicles in the plurality of vehicles 106. For example, the user may select a vehicle from a pool of vehicles available for rent through a car-sharing or car rental service. The user may remotely select a vehicle using his or her device 104, for example, using a GUI displayed on the interactive display 132.

The user may be identified, for example, by the imaging device 129 or other identification device that is communicatively coupled with the user identification module 128. For example, the user may be identified via a biometric identifier communicatively coupled with the device 104, which may verify a user's identity and relay verification to the controller 102 and/or the vehicle. In some embodiments, the imaging device 129 may capture an image of the user and the image may be compared to one or more images in a database of users. For example, the vehicle may send the data associated with the user to the controller 102 and the controller may verify the identity of the user with the user profile identification module 112. In other embodiments, the device 104 of the user may be used to verify the identity of the user. For example, the user profile module 118 and/or the user identification module 120 may capture identify information with respect to the user (e.g., using the imaging device 121) and may send the information to the controller 102 via the network 110. In some embodiments, the controller 102 may store a public key of the user and the user profile module 118 may encrypt a signal using a private key of the user such that the controller 102 may identify a user via asymmetric encryption.

At step 204, the controller 102 may determine a customary vehicle of the user. The customary vehicle is a vehicle that is known to the system 100 (e.g., via data saved in a database) to be sufficiently familiar to the user such that he or she is capable of operating the systems, features, and other aspects of the vehicle without instruction. In some embodiments, the user profile module 118 may store the customary vehicle. A user may associate a customary vehicle or vehicles with his or her profile when the profile is created, for example. In some embodiments, the controller 102 may store or receive historical data that shows a user has received instruction related to one or more systems, features, and other aspects of one or more of the plurality of vehicles 106 features of the plurality of vehicles (e.g., in the user instruction history module 114) and such information may be associated with the systems, feature, and other aspects such that one or more customary systems, customary features, or customary vehicle aspects are associated with the user.

At step 206, the controller 102 may determine differences between the selected vehicle and the customary vehicle. The controller 102 may determine such differences, for example, by comparing one or more systems, features, and other aspects of the selected vehicle with one or more systems, features, and other aspects of the customary vehicle or vehicles. The stored functional, safety, and performance features may include, for example, information relating to the control systems (e.g., steering, transmission, acceleration/deceleration, cruise control, active steering, lighting, navigation system, etc.), safety (e.g., airbag controls, seat belts, emergency brakes, emergency lights, etc.), and/or entertainment (e.g., Bluetooth connectivity, hands-free phone link, video, radio, etc.) feature of the selected vehicle and the customary vehicle.

At step 208, the controller 102 may cause information to be provided to the user that may inform the user about the determined differences between the user's customary vehicle and the selected vehicle. The determined difference information may be provided to the user using, for example, his or her device 104, an infotainment system of the selected vehicle from the plurality of vehicles 106, or another device capable of presenting information to the user that is communicatively coupled to the network 110 and/or the controller 102. The determined difference information may include one or more instructions or informational texts, audio files, and/or video files that may provide information to the user about features of the selected vehicle that are distinct from his or her customary vehicle, customary systems, customary features, or other customary vehicle aspects.

In some embodiments, a user may be given the opportunity to receive information about determined differences before he or she is at the vehicle selection phase, such as, for example, when making an initial reservation for one of the plurality of vehicles 106. For example, when selecting a vehicle, the controller 102 or other component may cause information to be provided to the user that lists differences between the potential selection and the customary vehicle. For example, the controller 102 may cause information to be provided to the user such as, for example, "Your selection does not include all-wheel drive and you customarily operate an all-wheel drive vehicle. Do you want to proceed with the selection?"

At step 210, the controller 102 may classify the determined differences into one or more categories. For example, the controller 102 may classify the determined differences based on whether or not they relate to passenger or vehicle safety into operational safety differences and performance differences. Operational safety differences may be those differences between the selected vehicle and the customary vehicle that may relate to operational safety of the vehicle. For example, information related to the differences between the control systems (e.g., steering, transmission, acceleration/deceleration, cruise control, active steering, lighting, navigation system, traction control systems, autonomous driving features, etc.) and safety systems (e.g., airbag controls, seat belts, emergency brakes, emergency lights, etc.) of the selected vehicle and the customary vehicle may each be classified as operational safety differences. Performance differences may be those differences between the selected vehicle and the customary vehicle that may not relate to operational safety of the vehicle but that may be beneficial for the user to learn before or while operating the selected vehicle. For example, information related to differences between the entertainment systems of the vehicle (e.g., differences related to the capabilities of the selected vehicle and the customary vehicle regarding, for example, Bluetooth connectivity, hands-free phone link, video, satellite radio, etc.).

Still referring to FIGS. 1 and 2, at step 212, the controller 102 and/or one or more systems on the vehicle may prevent operation of the vehicle until the user has acknowledged receiving the information related to the differences between the selected vehicle and the customary vehicle and the controller 102 has received such acknowledgement. The user may provide the acknowledgment as having received such information, for example, using the interactive display 132 of the device 104 or a similar display of an infotainment system (not shown) of the selected vehicle of the plurality of vehicles 106 and the acknowledgment may be sent to the controller 102 via the network 110. In some embodiments, the user may use a general-purpose computer (not shown) or other device connected to the network 110 to provide the acknowledgement. In some embodiments, the controller 102 may prevent access to the selected vehicle using the access control module 124 until the required information has been provided to the user and the user has acknowledged receipt of the information. For example, the required information may be sent to the device 104 of the user so that he or she can access and learn the information. The acknowledgement may be received through the interactive display 132 of the device 104, for example, and the user may then access the selected vehicle. In other embodiments, the user may be provided access to the selected vehicle but may be prevented from operating the selected vehicle by the operational control module 126, for example. The operational control module 126 may prevent the engine or other control systems (e.g., ignition) of the selected vehicle from operating until the user has received all required information and acknowledged such receipt.

In some embodiments, one or more of the controller 102 and the device 104 may update a profile of the user or the user instruction history module 114 with a status as having received the information and acknowledged receipt such that future vehicles having similar features may not require the user to receive and acknowledge receiving the information again. For example, at step 214 the controller 102 may record a user instruction history of the user. In some embodiments, the device 104 may record a user instruction history (e.g., in the user profile module 118) and may send the user instruction history to the controller 102 upon request of the controller 102 or when the user requests to rent a vehicle from the car-sharing service. The instruction history may prevent wasteful excessive instruction as well as ensure that the user receives all of the appropriate instruction related to one or more vehicles.

In some embodiments, the user instruction history module 114 may categorize instruction based on an aspect of the information itself, such as, for example, the type, class, size, make, model, and/or year-model of a vehicle the information describes and may apply such information during subsequent rentals of the same selected vehicle or a different selected vehicle. That is, at step 216, the controller 102 may inform the user of determined differences between a selected vehicle and the customary vehicle based on the user instruction history. For example, if the user selects a vehicle with a four-wheel drive option in a first instance and the user's customary vehicle is not a four-wheel drive vehicle, the user may be provided information about the use of a four-wheel drive system and may acknowledge receipt of such information. However, in subsequent instances of renting a four-wheel drive vehicle, the controller 102 may not provide information regarding the four-wheel drive feature of the vehicle or may provide less information than before, because the user previously received instruction on the use of four-wheel drive features. In some embodiments, the user instruction history module 114 may categorize information provided to the user based on the date it was provided to the user such that the controller 102 may determine whether to provide information to the user about a particular topic depending on how long since the user has received such information or operated a vehicle including a feature related to the topic.

Figure 3:
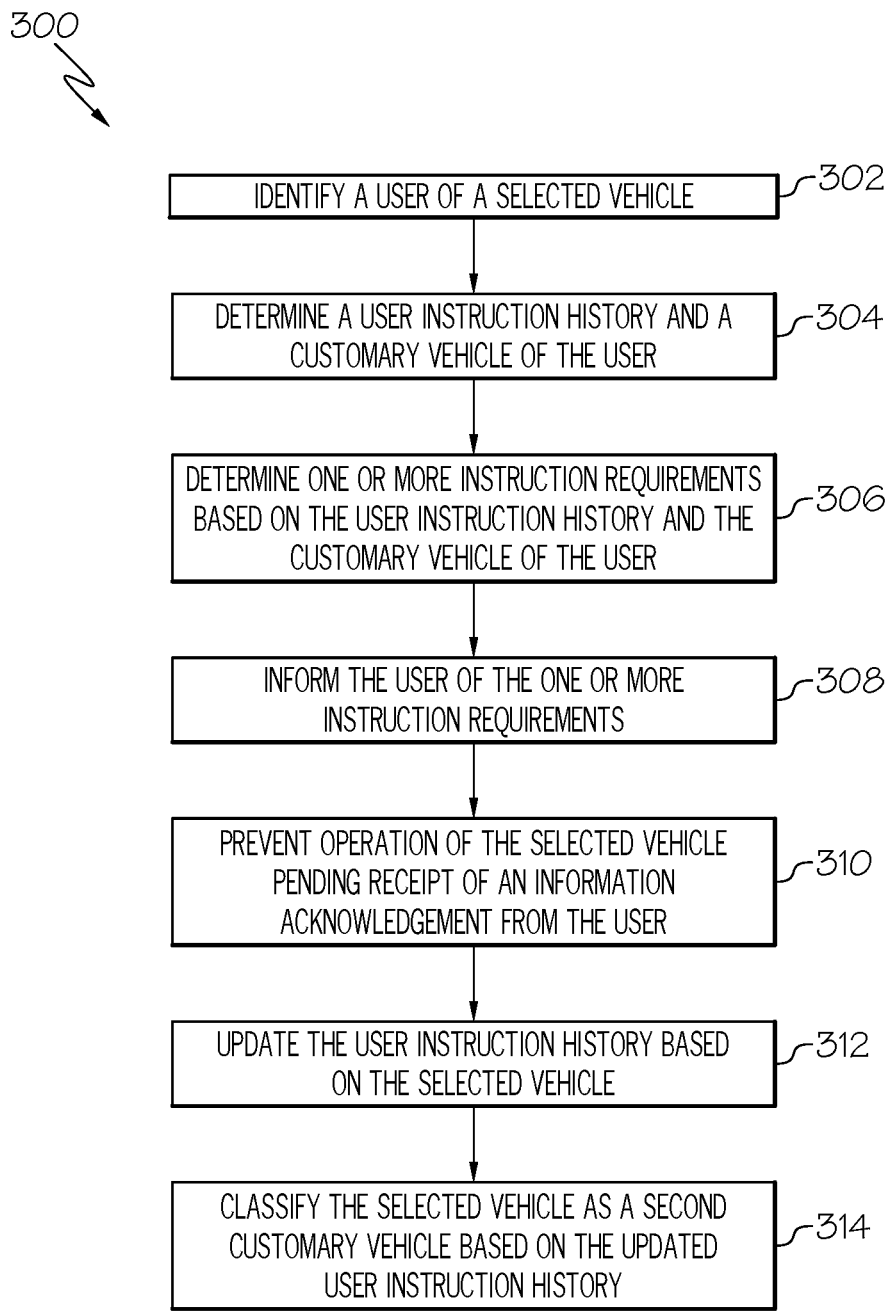
FIG. 3 depicts another method of providing a user instruction for operating a rented vehicle, according to one or more embodiments shown and described herein.

Referring now to FIGS. 1 and 3, a method 300 of identifying a user of a selected vehicle, determining a user instruction history and a customary vehicle of the user, determining one or more instruction requirements based on the user instruction history and the customary vehicle of the user, and informing the user of the one or more instruction requirements is described.

At step 302, the controller 102 may identify a user of a selected vehicle. The selected vehicle may be one of the vehicles in the plurality of vehicles 106. For example, the user may select a vehicle from a pool of vehicles available for rent through a car-sharing or car rental service. The user may remotely select a vehicle using his or her device 104, for example, using a GUI displayed on the interactive display 132.

The user may be identified, for example, by the imaging device 129 or other identification device that is communicatively coupled with the user identification module 128 of the selected vehicle. For example, the user may be identified via a biometric identifier communicatively coupled with the device 104, which may verify a user's identity and relay verification to the controller 102 and/or the vehicle. The imaging device 129 may capture an image of the user and the image may be compared to one or more images in an image database including images of users. For example, the vehicle may send the data associated with the user to the controller 102 and the controller may verify the identity of the user with the user profile identification module 112. In other embodiments, the device 104 of the user may be used to verify the identity of the user. For example, the user profile module 118 and/or the user identification module 120 may capture identify information with respect to the user (e.g., using the imaging device 121) and may send the information to the controller 102 via the network 110. In some embodiments, the controller 102 may store a public key of the user and the user profile module 118 may encrypt a signal using a private key of the user such that the controller 102 may identify a user via asymmetric encryption.

At step 304 the controller 102 may determine a user instruction history and a customary vehicle of the user. The user instruction history is a digital record of all user instructions that the user has received since he or she rented a vehicle using the system 100. The user instruction history may be stored, for example, in the user profile module 118 and uploaded to the controller 102 and/or may be stored in one or more memory modules of the controller 102. In some embodiments, the user instruction history may classify instruction based on an aspect of the information given to the user, such as, for example, the type, class, size, make, model, and/or year-model of a vehicle the information describes and may apply such information during subsequent rentals of the same selected vehicle or a different selected vehicle.

The customary vehicle is a vehicle that is known to the system 100 (e.g., via data saved in a database) to be sufficiently familiar to the user such that he or she is capable of operating the functional, safety, and performance features of the vehicle without instruction. In some embodiments, the user profile module 118 may store the customary vehicle. A user may associate his or her customary vehicle with his or her profile when the profile is created for example. In some embodiments, the controller 102 may store or receive historical data associated with one or more functional, safety, and performance features of the plurality of vehicles (e.g., in the user instruction history module 114).

At step 306, the controller 102 may determine one or more instruction requirements based on the user instruction history and the customary vehicle of the user. The user instruction requirements may generally be instruction regarding the features about which the user may be unfamiliar based on user instruction history and the customary vehicle of the user. That is, if a user has not ever received instruction and acknowledged receipt of such instruction for one or more systems or features of a vehicle and the system or feature is not similar to a system or feature of the user's customary vehicle, the controller 102 may determine that instruction is required with respect to the feature.

The controller 102 may cause the instruction requirements to be provided to the user at step 308. The instruction requirements may be provided to the user via for example, his or her device 104, an infotainment system of the selected vehicle from the plurality of vehicles 106, or another device capable of presenting information to the user that is communicatively coupled to the network 110 (e.g., a personal computer of the user (not shown)). The instruction requirements information (similar to the determined difference information discussed herein) may include one or more instructions or informational texts, audio files, and/or video files that may provide information to the user about features of the selected vehicle that are distinct from his or her customary vehicle or that the user otherwise may benefit from obtaining the knowledge of. The information may be provided to the user via the device 104 and/or an infotainment system of the selected vehicle, for example. In some embodiments, a user may be given the opportunity to receive information about determined differences before he or she is at the vehicle selection phase, such as, for example, when making an initial reservation for one of the plurality of vehicles 106.

In some embodiments, the controller 102 may prevent operation of or access to the selected vehicle until the instruction requirements have been received and acknowledged by the user at step 310. In some embodiments, the controller 102 may prevent access to the selected vehicle using the access control module 124 until the required information has been provided to the user and the user has acknowledged receipt of the information. For example, the required information may be sent to the device 104 of the user so that he or she can access and learn the information. The acknowledgement may be received through the interactive display 132 of the device 104, for example, and the user may then access the selected vehicle. In other embodiments, the user may be provided access to the selected vehicle but may be prevented from operating the selected vehicle by the operational control module 126, for example. The operational control module 126 may prevent the engine or other control systems (e.g., ignition) of the selected vehicle from operating until the user has received all required information and acknowledged such receipt.

At step 312, the controller 102 may update the user instruction history based on aspects of the selected vehicle. For example, the controller 102 may update the user instruction history based on the user receiving and acknowledging receipt of new information from related to the features and systems of the selected vehicle. That is, once a user has received information about features and systems of the selected vehicle, he or she is likely to require less or no instruction on such features and/or systems the next time they are encountered in a vehicle. Accordingly, updating the user instruction history may prevent reinstructing a user on information he or she already possesses.

At step 314, the controller 102 may classify a selected vehicle as a second customary vehicle of the user based on the updated user instruction history. That is, the controller 102 may determine based on the user instruction history and/or the amount or level of interaction with a particular system or feature of a selected vehicle that the user may be sufficiently instructed or accustomed to operating or interacting with a system or feature that he or she can sufficiently operate such system or feature without additional instruction. In some embodiments, a determination that the selected vehicle is a second customary vehicle may cause the controller 102 to automatically provide a user access to the selected second customary vehicle upon selection from amongst the plurality of vehicles 106.

Figure 4:
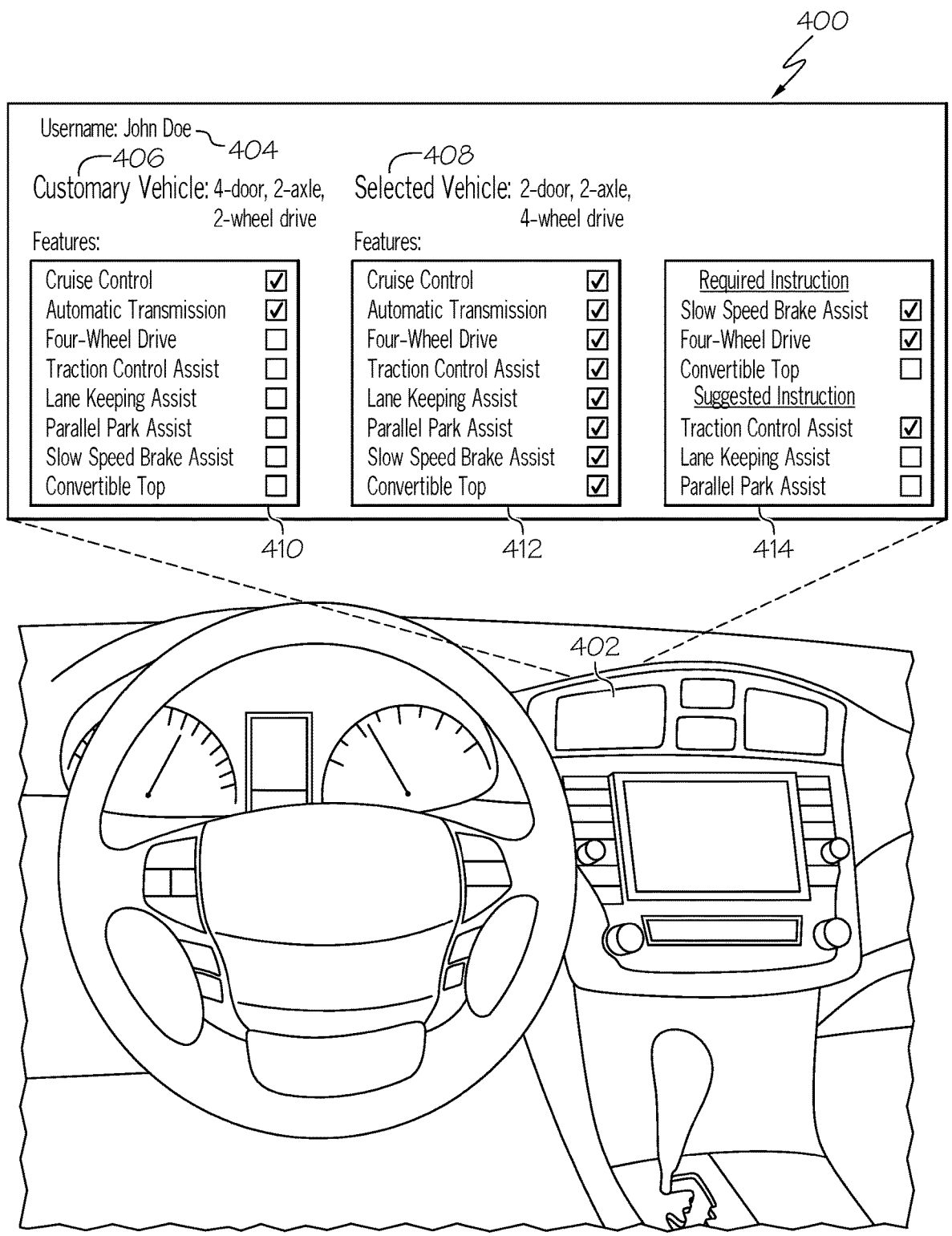
FIG. 4 depicts a vehicle including a system for providing a driver instruction, according to one or more embodiments shown and described herein.

Referring now to FIGS. 1 and 4, an exemplary embodiment of the system 100 for providing user instruction is shown. The system 100 includes a heads-up display (HUD) 400 that includes an interactive display 402. The HUD 400 may be a component in a selected vehicle 401 (only steering wheel, dashboard and infotainment portion including the interactive display 402 of the selected vehicle 401 are shown). The interactive display 402 of the HUD 400 may function similarly to the interactive display 132 of the device 104 in that it may receive user inputs and generate a visual output based on a GUI. The selected vehicle 401 may be one of the plurality of vehicles 106 and the HUD 400 may send and receive data from one or more of the controller 102 and the device 104 via the network 110 of FIG. 1. Displayed on the HUD 400 are a username portion 404, a customary vehicle selector 406, a selected vehicle selector 408, a customary vehicle features portion 410, a selected vehicle features portion 412, and an instruction report portion 414.

The username portion 404 gives a username of the current user of the selected vehicle. The username may be input from a user based on information received from, for example, the user profile module 118. In some embodiments, the user profile identification module 112 may verify the user profile before the system 100 grants access to the selected vehicle 401 via the access control module 124 as described herein. The username may be a name associated with an account for a car rental or car-sharing service that may generally provide a user the option to rent a vehicle from among the plurality of vehicles 106.

The customary vehicle selector 406 may provide a name or describe features or systems of the user's customary vehicle (not shown). As explained in greater detail herein, the customary vehicle of a user may be associated with the particular user and may be updateable by updating the user profile, for example. In embodiments, the customary vehicle selector 406 may include information that describes or names the user's customary vehicle. In the depicted embodiment, the customary vehicle selector 406 shows "4-door, 2-axle, 2-wheel drive" to indicate that the user's profile is associated with a customary vehicle that includes such features. In some embodiments, the customary vehicle selector 406 may simply list a class, make, model, and/or year of vehicle. For example, the customary vehicle selector 406 may list "2012 Toyota Camry," or "2012 Sedan." The customary vehicle features portion 410 may list various vehicle features and indicate whether the customary vehicle includes such features (e.g., in a check box as shown in FIG. 4). For example, the customary vehicle of the user John Doe in FIG. 4 includes cruise control and automatic transmission but does not include four-wheel drive, traction control assist, lane keeping assist, parallel park assist, slow speed brake assist, or convertible top. It is to be understood that the customary vehicle may or may not include additional features besides those explicitly listed. In some embodiments, the customary vehicle features portion 410 may be interactive such that a user can select one or more of the aspects listed in the customary vehicle features portion 410 to inform the controller 102 or other aspect of the system 100 of the features of the user's customary vehicle (e.g., by touching the interactive display 402 to select or deselect the check box).

The selected vehicle selector 408 may provide a name or describe features or systems of the selected vehicle 401. For example, the selected vehicle selector 408 may describe the selected vehicle as "2-door, 2-axle, 4-wheel drive" to indicate that the selected vehicle 401 includes such features. The selected vehicle selector 408 may be changeable based on the user changing his or her mind about which vehicle he or she wants to rent from the car-sharing or car rental service and selecting a different vehicle. In some embodiments, the selected vehicle selector 408 may simply list a class, make, model, and/or year of vehicle. The selected vehicle features portion 412 may list various vehicle features and indicate whether the selected vehicle 401 includes such features (e.g., in a check box as shown in FIG. 4). For example, the selected vehicle 401 includes cruise control, automatic transmission, four-wheel drive, traction control assist, lane keeping assist, parallel park assist, slow speed brake assist, and a convertible top. It is to be understood that the selected vehicle 401 may or may not include additional features besides those explicitly listed. In embodiments, the features listed in the selected vehicle features portion 412 may auto populate based on data about the selected vehicle stored in, for example, a memory module of the controller 102 or other storage location accessible by the controller 102. The features listed in the selected vehicle features portion 412 are not updateable by the user of the selected vehicle 401, but may be updateable by other members of the car-sharing or car rental service. For example, an owner of the selected vehicle 401 may cause the features listed in the selected vehicle features portion 412 to be updated if the owner adds systems or features to his or her vehicle.

The instruction report portion 414 lists the instructions or other information about the selected vehicle that must be provided to the user before the user may access and/or operate the selected vehicle 401. As shown in FIG. 4, the instruction report portion 414 has "Required Instruction" and "Suggested Instruction." The required instructions may include systems and features that relate to vehicle safety or proper operation of the vehicle and safety systems thereon. For example, it may be required that the user receive information regarding the slow speed brake assist, the four-wheel drive capability, and the convertible top before the selected vehicle 401 is operable by the user. In some embodiments, acknowledgment of having received such instruction must be received by the selected vehicle 401 and/or the controller 102 before the selected vehicle 401 is operable. In the example shown in FIG. 4, the user has not currently received or acknowledged receipt of instruction related to the use of the convertible top feature of the selected vehicle 401 and the user's customary vehicle does not include a convertible top feature as demonstrated in the customary vehicle features portion 410. Accordingly, the user may be prevented from operating the selected vehicle, for example, by the controller 102 through the operational control module 126. In some embodiments, the user may be prevented from accessing the selected vehicle 401 by the controller 102 through the access control module 124. In such embodiments, the user can receive information and acknowledge receipt of such information using a device remote from the selected vehicle 401, such as the device 104 or a personal computer (not shown) of the user that is connected to the network 110. In embodiments, the required and/or suggested instructional information may be displayed to the user via the device 104 and/or the interactive display 402 of the vehicle and audio associated with the instruction may play over an audio system (not depicted) of the vehicle 401, for example.

In the depicted embodiment, information about systems or features that are known to the user of the selected vehicle 401 because they are on his or her customary vehicle or vehicles is not required to be given to the user because the user already encounters such systems or features on his or her customary vehicle. Accordingly, features such as cruise control and automatic transmission, which are generic to both the user's customary vehicle and the selected vehicle 401 are not listed in the instruction report portion 414.

The suggested instruction may be instructional information about features or systems of the selected vehicle that are not known to the user as determined based on his or her customary vehicle and are not related to the safety or proper operation of the selected vehicle 401. The list of suggested instruction topics shown in FIG. 4 is not limited to such topics and may include other information about the selected vehicle. Additionally, in some embodiments the suggested instruction topics may be required. In some embodiments, the user can received information and acknowledge receipt of such information using the selected vehicle 401 or a remote device as discussed herein.

It should now be understood that users of a car-sharing or car rental service may be identified as a user of a selected vehicle, selected from a plurality of vehicles associated or offered for use by the car-sharing or car rental service. A controller or other device may be used to determine a customary vehicle of the user and may determine differences between the selected vehicle and the user's customary vehicle. The user may be provided information relating to the operation of the selected vehicle for systems or features of the selected vehicle that are not similar to the systems or features of the user's customary vehicle. The user may acknowledge receipt of such information and access to or operational capability of the selected vehicle may be granted to the use. Users who are better informed about the vehicle they select to operate are more likely to enjoy easy operation and owners are more likely to provide their vehicles for use by other unknown users of the system. Accordingly, the use of car-sharing and car rental services may proliferate upon the implementation of such a system and such systems are required.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
identifying a user of a selected vehicle;
determining a customary vehicle of the user based on the identification;
determining differences between features of the selected vehicle and features of the customary vehicle;
classifying the determined differences into operational safety differences and performance differences;
displaying the features of the selected vehicle, the features of the customary vehicle, the operational safety differences, and the performance differences on a screen;
preventing access to the selected vehicle and operation of the selected vehicle until receipt of information acknowledgement through an interactive display from the user, wherein the information acknowledgment acknowledges that the operational safety differences and the performance differences have been informed to the user; and
receiving the information acknowledgement from the user and allowing the operation of the selected vehicle upon receiving the information acknowledgement from the user.

2. The method of claim 1, wherein the user is identified using an onboard camera of the vehicle.

3. The method of claim 1, wherein the user is identified using a digital signature of the user.

4. The method of claim 3, wherein the digital signature is provided using a device of the user.

5. The method of claim 1, further comprising:
recording a user instruction history; and
informing the user of the determined differences based on the user instruction history.

6. The method of claim 5, further comprising:
classifying the selected vehicle as a second customary vehicle based on the user instruction history.

7. The method of claim 1, further comprising:
receiving a selection of an additional feature for the customary vehicle;
adding the additional feature to the features of the customary vehicle; and
updating the differences between the features of the selected vehicle and the features of the customary vehicle.

8. The method of claim 1, further comprising:
receiving a deselection of a feature from the features of the customary vehicle;
removing the deselected feature from the features of the customary vehicle; and
updating the differences between the features of the selected vehicle and the features of the customary vehicle.

9. The method of claim 1, wherein:
the displayed features of the customary vehicles are updatable by the user; and
the displayed features of the selected vehicles are not updatable by the user.

10. A system comprising:
a user identification device; and
a controller configured to:
identify a user of a selected vehicle;
determine a customary vehicle of the user based on the identification;
determine differences between features of the selected vehicle and features of the customary vehicle;
classify the determined differences into operational safety differences and performance differences;
display the features of the selected vehicle, the features of the customary vehicle, the operational safety differences, and the performance differences on a screen;
prevent access to the selected vehicle and operation of the selected vehicle until receipt of information acknowledgement through an interactive display from the user, wherein the information acknowledgment acknowledges that the operational safety differences and the performance differences have been informed to the user; and
receive the information acknowledgement from the user and allow the operation of the selected vehicle upon receiving the information acknowledgement from the user.

11. The system of claim 10, the controller further configured to:
record a user instruction history; and
inform the user of the determined differences based on the user instruction history.

12. The system of claim 11, the controller further configured to:
classify the selected vehicle as a second customary vehicle based on the user instruction history.

13. A method comprising:
identifying a user of a selected vehicle;
determining a user instruction history and a customary vehicle of the user based on the identification;
determining one or more instruction requirements based on the user instruction history and the customary vehicle of the user;
determining differences between features of the selected vehicle and features of the customary vehicle;
classifying the determined differences into operational safety differences and performance differences;
displaying features of the selected vehicle, features of the customary vehicle, the operational safety differences, and the performance differences, and the one or more instruction requirements on a screen;
preventing access to the selected vehicle and operation of the selected vehicle until receipt of information acknowledgement through an interactive display from the user, wherein the information acknowledgment acknowledges that the operational safety differences and the performance differences, and the one or more instruction requirements have been informed to the user; and
receiving the information acknowledgement from the user and allowing the operation of the selected vehicle upon receiving the information acknowledgement from the user.

14. The method of claim 13, further comprising:
updating the user instruction history based on the selected vehicle; and
classifying the selected vehicle as a second customary vehicle based on the updated user instruction history.

* * * * *